United States Patent
Usui

(10) Patent No.: US 8,108,611 B2
(45) Date of Patent: Jan. 31, 2012

(54) CACHE MEMORY SYSTEM

(75) Inventor: Hiroyuki Usui, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 420 days.

(21) Appl. No.: 12/432,883

(22) Filed: Apr. 30, 2009

(65) Prior Publication Data

US 2009/0292880 A1 Nov. 26, 2009

(30) Foreign Application Priority Data

May 23, 2008 (JP) ................................ 2008-135757

(51) Int. Cl.
*G06F 12/08* (2006.01)
(52) U.S. Cl. ....................................... 711/128; 711/129
(58) Field of Classification Search .................. 711/128, 711/129, 103, E12.008, E12.001, E12.017, 711/E12.083
See application file for complete search history.

(56) References Cited

U.S. PATENT DOCUMENTS

| | | | |
|---|---|---|---|
| 2007/0150640 A1 | 6/2007 | Begon et al. | |
| 2008/0114924 A1* | 5/2008 | Frayer et al. | 711/103 |

FOREIGN PATENT DOCUMENTS

JP 2007-172623 7/2007

OTHER PUBLICATIONS

U.S. Appl. No. 12/718,378, filed Mar. 5, 2010, Usui.

* cited by examiner

*Primary Examiner* — Vu Le
(74) *Attorney, Agent, or Firm* — Oblon, Spivak, McClelland, Maier & Neustadt, L.L.P.

(57) ABSTRACT

A cache memory system controlled by an arbiter includes a memory unit having a cache memory whose capacity is changeable, and an invalidation processing unit that requests invalidation of data stored at a position where invalidation is performed when the capacity of the cache memory is changed in accordance with a change instruction. The invalidation processing unit includes an increasing/reducing processing unit that sets an index to be invalidated in accordance with a capacity before change and a capacity after change and requests the arbiter to invalidate the set index, and an index converter that selects either an index based on the capacity before change or an index based on the capacity after change associated with an access address from the arbiter, and the capacity of the cache memory can be changed while maintaining the number of ways of the cache memory.

19 Claims, 8 Drawing Sheets

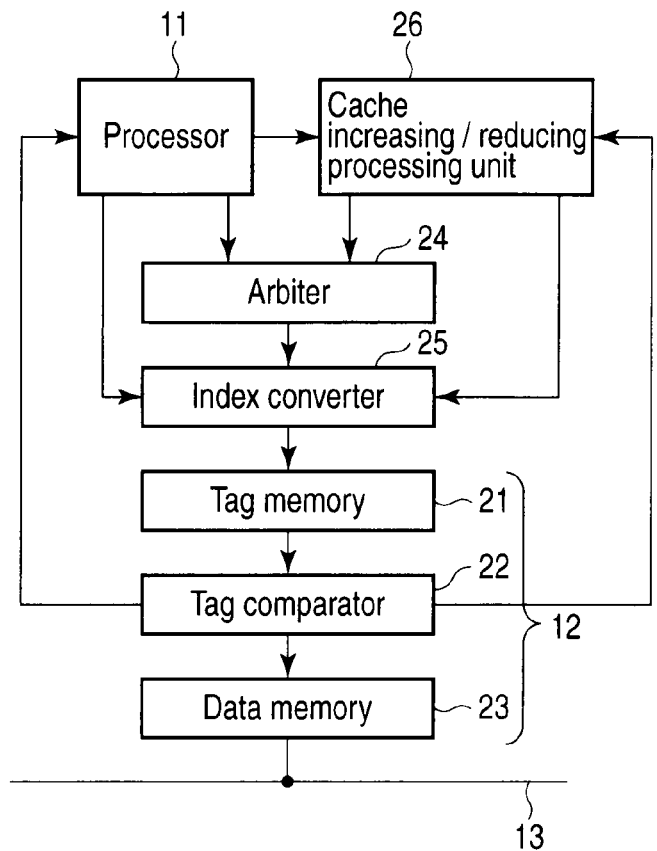
F I G. 1
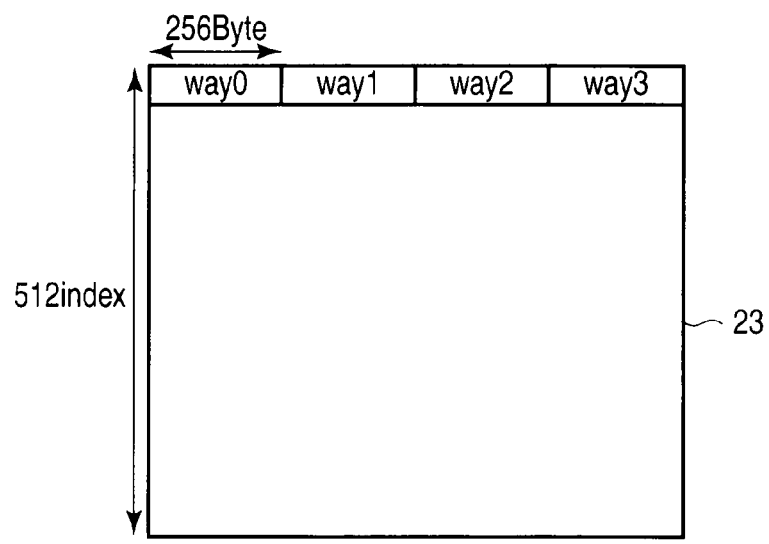
F I G. 2

| 512K | tag(15bit) | index(9bit) | 8bit |
F I G. 3 A
| 256K | tag(16bit) | index(8bit) | 8bit |
F I G. 3 B
| 128K | tag(17bit) | index(7bit) | 8bit |
F I G. 3 C
| 64K | tag(18bit) | index(6bit) | 8bit |
F I G. 3 D
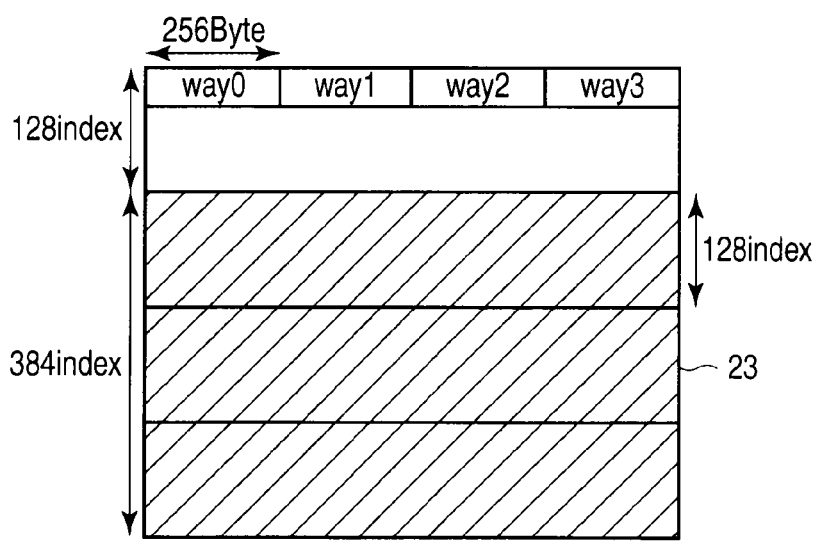
F I G. 4

| ON / OFF (25b) | Invalidation target (25c) | Retry flag | Selection result |
|---|---|---|---|
| ON | ON | OFF | Current |
| OFF | ON | OFF | Current |
| ON | OFF | OFF | After change |
| OFF | OFF | OFF | Current |
| ON | ON | ON | After change |
| OFF | ON | ON | Current |
| ON | OFF | ON | After change |
| OFF | OFF | ON | Current |

~ 25e

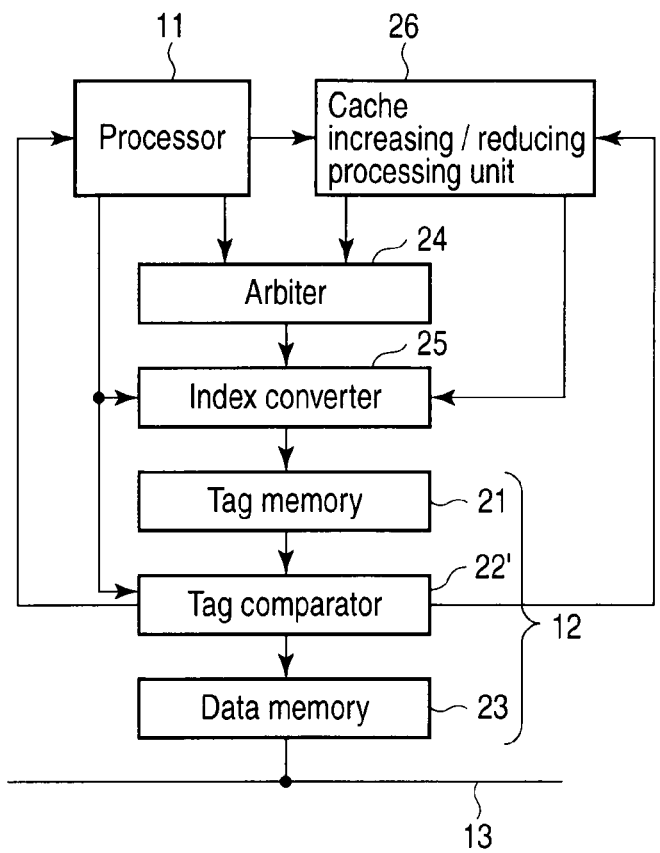
F I G. 9
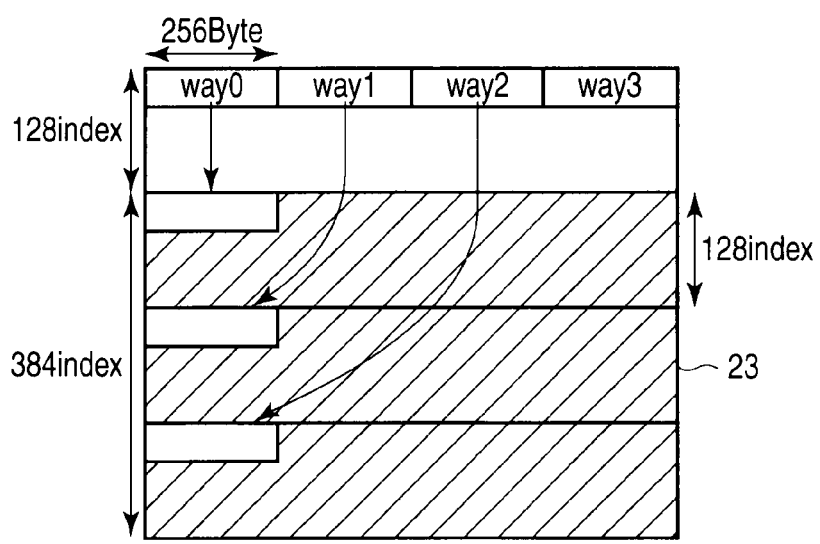
F I G. 10

| Before change | After change | Comparative bit |
|---|---|---|
| 64K | 128K | ??0 |
| | 256K | ?00 |
| | 512K | 000 |
| 128K | 256K | ?0? |
| | 512K | 00? |
| 256K | 512K | 0?? |

~22c

| ON / OFF (25b) | Invalidation target (25c) | indexA | indexB |
|---|---|---|---|
| ON | ON | Current | After change |
| OFF | ON | Current | Don't Care |
| ON | OFF | After change | Don't Care |
| OFF | OFF | Current | Don't Care |

~ 25e'

CACHE MEMORY SYSTEM

CROSS-REFERENCE TO RELATED APPLICATIONS

This application is based upon and claims the benefit of priority from prior Japanese Patent Application No. 2008-135757, filed May 23, 2008, the entire contents of which are incorporated herein by reference.

BACKGROUND OF THE INVENTION

1. Field of the Invention

The present invention relates to a cache memory system. More particularly, the present invention relates to a cache system that can change a capacity (a memory size) of a cache memory.

2. Description of the Related Art

As a method of suppressing a power consumption of a cache system, there is a method of dividing a data memory and a tag memory into a plurality of parts and restricting access to addresses of some of the divided parts only to reduce a power consumption at the time of access. Further, in recent years, to counteract the problem of power usage at the time of no access, there is adopted a method of inhibiting access to some of the ways in a set-associative cache to reduce a capacity of the cache memory and turning off a power supply for a memory assigned to these ways. In this method, when access to a given way is inhibited, data stored in this way is invalidated, and hence the data must be written back in a memory in a lower layer. Contrarily, when canceling access inhibition, stored data does not have to be processed at all.

However, in the case of the method that inhibits access to some of the ways, the number of ways must be reduced to decrease a capacity of the cache memory, the method becomes weak in regard to conflict misses, resulting in a problem that performances as the cache memory are degraded. Furthermore, there is also a problem that the capacity cannot be increased/decreased beyond the number of ways.

It is to be noted that the following suggestion (Literature 1) is present as a technology concerning the present invention (see, for example, Jpn. Pat. Appln. KOKAI Publication no. 2007-172623).

Literature 1 relates to an operating method of an integrated circuit having a cache memory of a variable size, and a size of the cache memory is changed by using a mask that varies in accordance with a cache memory size signal. However, when changing a size of the cache memory, access to the cache memory must be inhibited.

BRIEF SUMMARY OF THE INVENTION

According to a first aspect of the present invention, there is provided a cache memory system controlled by an arbiter, comprising: a memory unit having a cache memory whose capacity is changeable; and an invalidation processing unit that requests invalidation of data stored at a position where invalidation is performed when the capacity of the cache memory is changed in accordance with a change instruction, wherein the invalidation processing unit includes: an increasing/reducing processing unit that sets an index that is invalidated in accordance with a capacity before change and a capacity after change, and requests the arbiter to invalidate the set index; and an index converter that selects either an index based on the capacity before change or an index based on the capacity after change that is associated with an access address from the arbiter, and the invalidation processing unit enables changing the capacity of the cache memory while maintaining the number of ways in the cache memory.

According to a second aspect of the present invention, there is provided a cache memory system controlled by an arbiter, comprising: a memory unit having a cache memory whose capacity is changeable, the memory unit including a tag memory that stores tag information associated with an access address and a tag comparator that compares the tag information read from the tag memory with tag information at the access address; and an invalidation processing unit that requests invalidation of data stored at a position where invalidation is effected when the capacity of the cache memory is changed in accordance with a reducing instruction, wherein the invalidation processing unit includes: an increasing/reducing processing unit that sets an index that is invalidated in accordance with a capacity before change and a capacity after change and requests the arbiter to invalidate the set index; and an index converter that selects either an index based on the capacity before change or an index based on the capacity after change associated with the access address from the arbiter, and the invalidation processing unit enables changing the capacity of the cache memory while maintaining the number of ways of the cache memory.

According to a third aspect of the present invention, there is provided a cache memory system controlled by an arbiter, comprising: a memory unit having a cache memory whose capacity is changeable, the memory unit including a tag memory storing tag information associated with an access address and a tag comparator that compares the tag information read from the tag memory with tag information at the access address and sets ways to be invalidated; and an invalidation processing unit that requests invalidation of data stored at a position where invalidation is performed when the capacity of the cache memory is changed in accordance with an increasing instruction, wherein the invalidation processing unit includes: an increasing/reducing processing unit that sets an index to be invalidated in accordance with a capacity before change and a capacity after change and requests the arbiter to invalidate the set index; and an index converter that selects either an index based on the capacity before change and an index based on the capacity after change associated with the access address from the arbiter, and the invalidation processing unit enables changing the capacity of the cache memory while maintaining the number of ways of the cache memory.

BRIEF DESCRIPTION OF THE SEVERAL VIEWS OF THE DRAWING

FIG. 1 is a block diagram showing a structural example of a cache system according to a first embodiment of the present invention;

FIG. 2 is a structural view showing an example of a data memory (a cache) in the cache system according to the first embodiment;

FIGS. 3A to 3D are views each showing a structure of an access address for each memory size according to the first embodiment;

FIG. 4 is a view showing an example where a capacity of a cache is changed from 512 Kbytes to 128 Kbytes according to the first embodiment;

FIG. 9 is a block diagram showing a structural example of a cache system according to a second embodiment of the present invention;

FIG. 10 is a view showing an example where a capacity of a cache is changed from 128 Kbytes to 512 Kbytes according to a second embodiment;

DETAILED DESCRIPTION OF THE INVENTION

Figure 5:
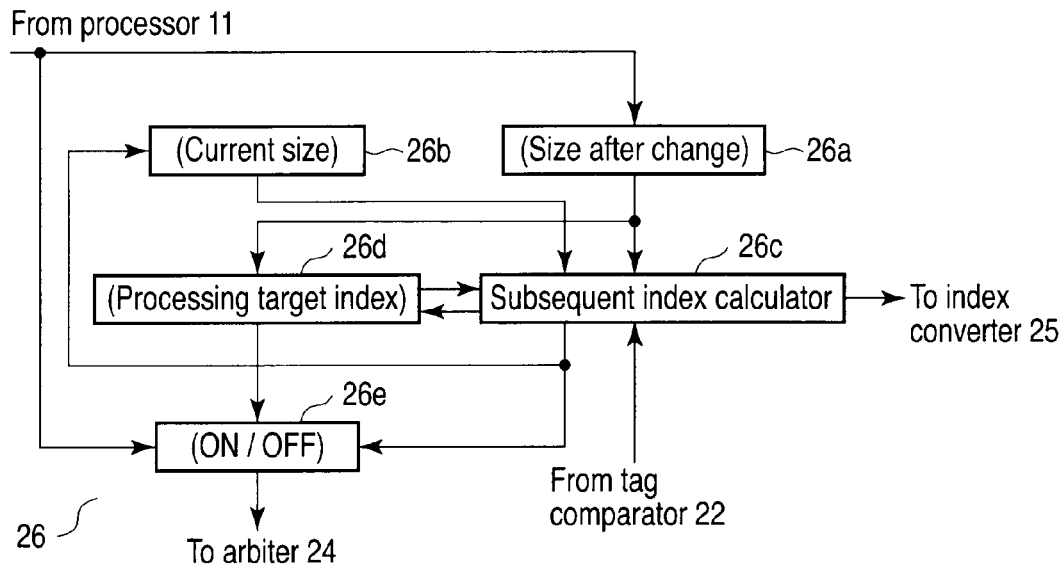
FIG. 5 is a block diagram showing a structural example of a cache increasing/reducing processing unit in the cache system according to the first embodiment.

Embodiments of the present invention will be described with reference to the accompanying drawings. It should be noted that the drawings are schematic ones and the dimension ratios shown therein are different from the actual ones. The dimensions vary from drawing to drawing and so do the ratios of dimensions. The following embodiments are directed to a device and a method for embodying the technical concept of the present invention and the technical concept does not specify the material, shape, structure or configuration of components of the present invention. Various changes and modifications can be made to the technical concept without departing from the scope of the claimed invention.

First Embodiment

FIG. 1 shows a structural example of a cache system according to a first embodiment of the present invention. It is to be noted that an example where the present invention is constituted as an integrated circuit including a processor will be described.

In FIG. 1, a processor 11 uses an access address of, e.g., 32 bits to access a cache memory unit 12. The cache memory unit 12 includes a tag memory 21, a tag comparator 22, and a data memory (a cache) 23. The data memory 23 is connected with a bus 13.

In this embodiment, for example, as shown in FIG. 2, the data memory 23 is a 4-way (a way 0 to a way 3) cache having a line size of 256 bytes and a maximum capacity of 512 Kbytes (kilo bytes). That is, in the case of a cache having a capacity of 512 Kbytes, 256 bytes×4 ways are present for 512 indices. Further, in this embodiment, a capacity of the data memory 23 can be changed to four patterns (memory sizes) of, e.g., 512 Kbytes, 256 Kbytes, 128 Kbytes, and 64 Kbytes. It is to be noted that the data memory 23 is placed in various layers, such as L1, L2, and L3, but the layer is not specified in this embodiment. Furthermore, the plurality of types of data memories 23 (e.g., a direct cache, a set-associative cache, and a full-associative cache) are present in accordance with respective associative degrees, but this embodiment can cope with any associative degree.

Cache access when a capacity of the cache memory is not reduced, i.e., regular memory access from the processor 11 when a capacity of the data memory 23 is not changed is made by fetching tag information of an index corresponding to an access address from the tag memory 21 through an arbiter 24 and an index converter 25, performing tag comparison between the fetched tag information and tag information at the access address, and accessing the data memory 23 in accordance with a result of this comparison.

On the other hand, cache access from the processor 11 when decreasing the capacity of the cache memory is made by fetching from the tag memory 21 tag information of an index corresponding to an access address that is updated in accordance with invalidation of data (invalidation/reassignment of an index) involved due to a decrease in capacity of the data memory 23 through a cache increasing/reducing processing unit 26, the arbiter 24, and the index converter 25, performing tag comparison between the fetched tag information and tag information at the access address, and accessing the data memory 23 in accordance with this comparison.

Each of FIGS. 3A to 3D shows a size of tag information at an access address that is used for tag comparison in the tag comparator 22 in accordance with each memory size. That is, FIG. 3A shows an access address when a memory size is 512 Kbytes, and this access address has a 32-bit structure having tag information (tag) of 15 bits and an index of 9 bits. FIG. 3B shows an access address when a memory size is 256 Kbytes, and this access address has a 32-bit structure having tag information of 16 bits and an index of 8 bits. FIG. 3C shows an access address when a memory size is 128 Kbytes, and this access address has a 32-bit structure having tag information of 17 bits and an index of 7 bits. FIG. 3D shows an access address when a memory size is 64 Kbytes, and this access address has a 32-bit structure having tag information of 18 bits and an index of 6 bits.

It is to be noted that a size of the tag information stored in the tag memory 21 is set to "18 bits" which is equal to a size of the tag information depicted in FIG. 3D, irrespective of a current capacity of the cache memory, in order to enable a reduction in capacity of the cache memory.

An operation when reducing a capacity of the cache memory while maintaining the number of ways will now be described. In this example, a description will be given as to a situation where a capacity is changed from 512 Kbytes to 128 Kbytes. In this example, as shown in, e.g., FIG. 4, 384 indices must be invalidated (data of indices to be invalidated must be written back in a low-order memory in the case of a write-back cache). An address assigned to each invalidated index is reassigned to an index after change for every 128 indices. For example, addresses respectively assigned to indices 192, 320, and 448 at the time of 512 Kbytes are all assigned to an index 64 after the capacity is changed to 128 Kbytes. A new index based on a size after change is obtained as a "remainder" when an old index based on a (current) size before change is divided by the size after change.

For example, it is assumed that the processor 11 issues an instruction of reducing the capacity of the cache memory from 512 Kbytes to 128 Kbytes. Then, this "reducing instruction" is supplied to the cache increasing/reducing processing unit 26 and the index converter 25.

When the "reducing instruction" is input from the processor 11 as shown in, e.g., FIG. 5, the cache increasing/reducing unit 26 sets a "size after change" in a holder 26a. Moreover, a "current size" is set in a holder 26b, and supplying the "size after change" and the "current size" to a subsequent index calculator 26c enables setting a range of indices which are to be invalidated. In this example, indices 128 to 511 are set as a range of invalidation. The subsequent index calculator 26c sets in a holder 26d a "processing target index (e.g., the index 128)" as a first processing target in indices in the range of invalidation.

On the other hand, when the "reducing instruction" is input from the processor 11, an ON/OFF state machine 26e is turned on. Additionally, in the ON state, the "processing target index" is input from the holder 26d, the ON/OFF state machine 26e requests the arbiter 24 to invalidate corresponding indices.

Figure 6:
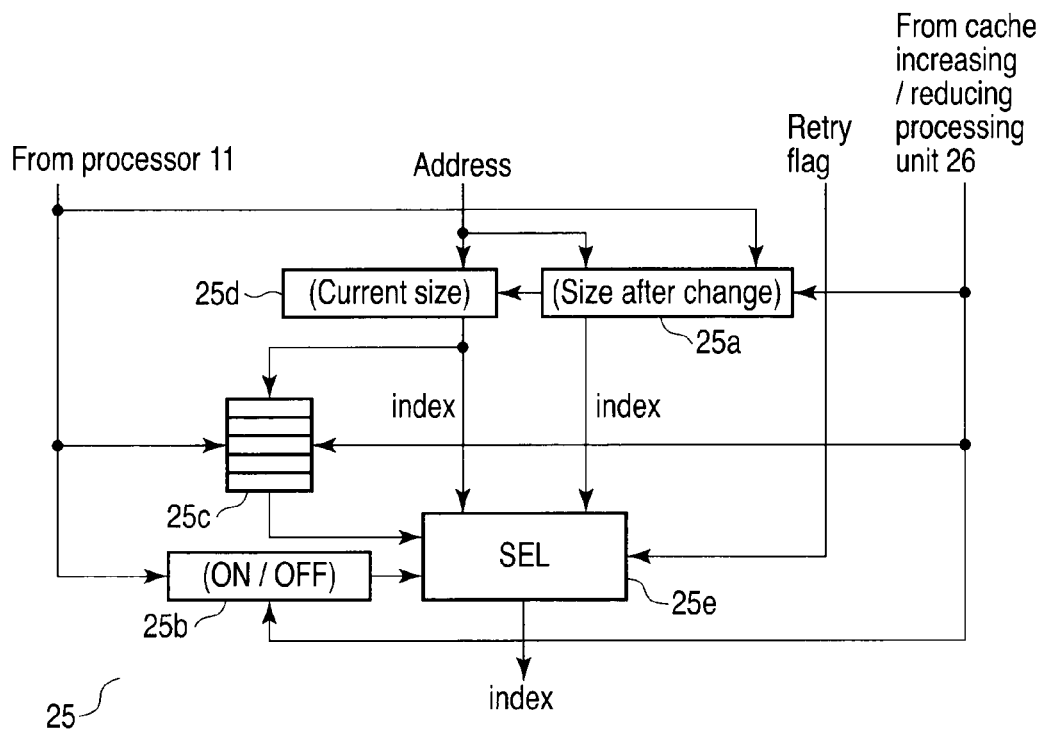
FIG. 6 is a block diagram showing a structural example of an index converter in the cache system according to the first embodiment.

When the "reducing instruction" is input from the processor 11 as shown in, e.g., FIG. 6, the index converter 25 sets the "size after change" in a holder 25a. Further, an ON/OFF state machine 25b is turned on, and an invalidation target table 25c is activated. The invalidation target table 25c has entries corresponding to a maximum number of indices (512 indices in this example), and each entry stores information indicative of whether each index based on the "current size" is an invalidation target. Furthermore, when the "reducing instruction" is input to the invalidation target table 25c, flags of indices as invalidation targets are all set to "ON". That is, the invalidation target table 25c is utilized to check whether each index based on the "current size" held in a holder 25d is an invalidation target when a "processing target index" is input from the cache increasing/reducing processing unit 26.

Figures 7, 8:
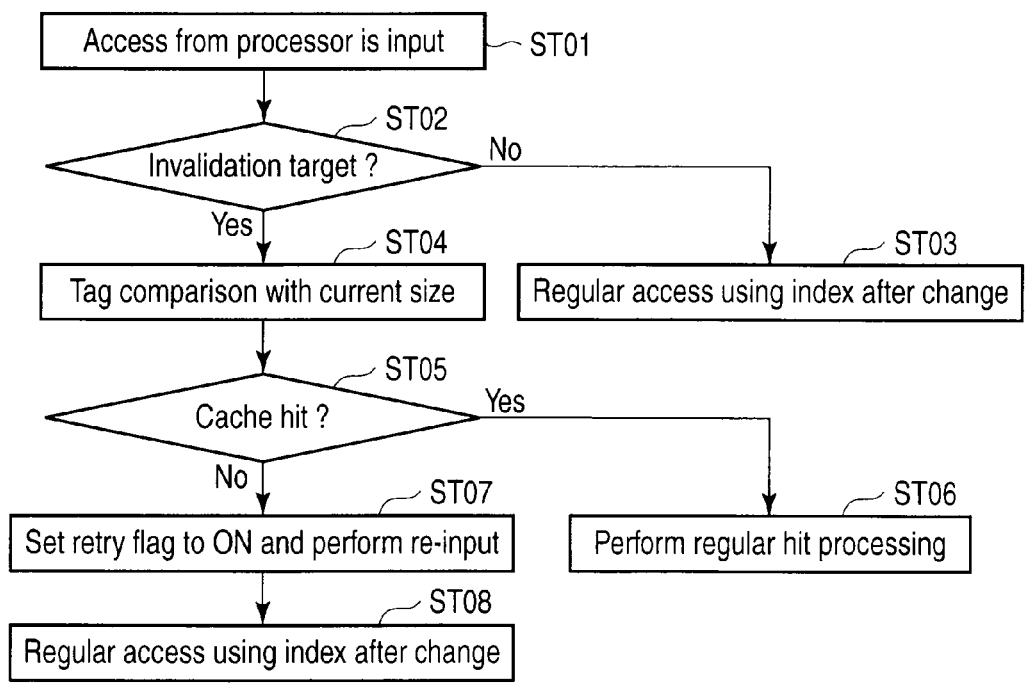
FIG. 7 is a view showing a selection logic of a selector constituting the index converter according to the first embodiment.
FIG. 8 is a flowchart for explaining a flow of processing when a regular cache access request is produced during execution of processing for invalidation according to the first embodiment.

A selector (SEL) 25e selects one of an index based on the "current size" and an index based on the "size after change" which is associated with an access address input from the arbiter 24. At this time, one of the indices to be utilized is determined based on a state of the ON/OF state machine 25b, information indicative of whether the index based on the "current size" is an invalidation target which is obtained by making reference to the invalidation target table 25c, and a retry flag which is input from the arbiter 24 together with the access address. It is to be noted that the ON/OFF state machine 25b is turned off based on an output "end of invalidation processing" from the cache increasing/reducing processing unit 26. FIG. 7 shows a selection logic in the selector 25e.

For example, when reducing the capacity of the cache memory, the cache increasing/reducing processing unit 26 outputs an "invalidation request" (an output from the ON/OFF state machine 26e is ON). As a result, a conflict that arises with regular cache access is controlled by the arbiter 24. When a conflict occurs, the arbiter 24 may give priority to either type of processing, e.g., regular cache access or the "invalidation request".

A situation where the "invalidation request" for an "index 192" is selected by the arbiter 24 will be first assumed and described. At the time of the "invalidation request", the retry flag is always in an OFF state. Therefore, when the "invalidation request" is input to the index converter 25, the selector 25e selects an index number to be accessed. At this time, when the processing for invalidation is being executed, the ON/OFF state machine 25b is constantly "ON", and flags (information indicative of invalidation targets or not) of corresponding entries in the validation target table 25c are likewise all "ON". Therefore, as the index number (a selection result) to be accessed, an index number based on the "current size" (512 Kbytes in this example) held in the holder 25d, i.e., the "index 192" is selected. It is to be noted that an index number based on the "size after change" must be "64" from a remainder of 192÷128.

Then, tag information is read from the tag memory 21 in accordance with the selected "index 192". As a result of this reading, assuming that the ways 0 to 2 are "valid" and the way 3 is "invalid", processing for invalidation of the ways 0 to 2 in the data memory 23 is executed. It is to be noted that, when the data memory 23 is a write-back cache, data of a way that is in a "dirty state" must be written back.

When the processing for invalidation is terminated, the tag comparator 22 informs the cache increasing/reducing processing unit 26 of "end of the invalidation processing" and the "index number" subjected to the processing. The tag comparator 22 also informs the processor 11 of "end of the invalidation processing". The cache increasing/reducing processing unit 26 having received this information determines an "index number" that is a next processing target by using the subsequent index calculator 26c, and sets the determined number in the holder 26d. Further, the cache increasing/reducing processing unit 26 also informs the index converter 25 of the "index number" subjected to the processing for invalidation. On the other hand, the index converter 25 switches a flag of an entry in the invalidation target table 25c corresponding to the received "index number" to "OFF". When the "index number" as the next processing target is determined, the cache increasing/reducing processing unit 26 again issues an "invalidation request".

When the above-explained operation is repeated and the "index number" supplied to the cache increasing/reducing processing unit 26 together with "end of the invalidation processing" is an "index number" as a last invalidation target, the ON/OFF state machine 26e is turned off because of end of the processing for invalidation with respect to the "reducing instruction". Furthermore, the "current size" in the holder 26b is updated by the "size after change" in the holder 26a. Moreover, the index converter 25 is also informed of end of the processing for invalidation with respect to the "reducing instruction", and the ON/OFF state machine 25b is turned off. Additionally, the "current size" in the holder 25d is updated by the "size after change" in the holder 25a.

Finally, the tag information in the tag memory 21 is updated by the entry in the invalidation target table 25c whose flag is switched to "OFF", thereby terminating a series of operations with respect to the "reducing instruction".

A description will now be given as to a case where a conflict occurs due to regular cache access from the processor 11 during the processing for invalidation. An "access request" from the processor 11 is first input to the index converter 25 in a state where a retry flag is OFF (a step ST01).

At this time, in the index converter 25, as shown in, e.g., FIG. 7, the ON/OFF state machine 25b is in the ON state, and the retry flag is in the OFF state. Therefore, an "index number" to be selected is determined based on whether an index to be accessed is an "invalidation target" (a step ST02). For example, since access to an "index 32" is not an "invalidation target" from the beginning, an "index number" based on the "size after change" is selected. In this case, since the "index number" is not changed before and after a reduction, the "index 32" is selected as it is (a step ST03).

Further, in access to, e.g., the "index 192", when the processing for invalidation with respect to its "index number" is terminated, valid data is no longer stored at a position corresponding to the "index 192" assigned at the time of 512

Kbytes, and hence an "index 64" based on the "size after change" is selected. That is, since valid data is rearranged at a position corresponding to the "index 64", regular access is performed with the "index 64" after change (the step ST03).

On the other hand, in access to, e.g., the "index 192", when the processing for invalidation is not finished yet, the "index 192" is used to make reference to the tag information in the tag memory 21, and tag comparison is performed in the tag comparator 22 (a step ST04). In the case of "cache hit (=Yes)", since valid data is present at a position that is not invalidated (the "index 192" based on the "current size"), "regular hit processing" is executed (steps ST05 and ST06).

On the other hand, in the case of "cache miss (=No)", since there is a risk that the processing for invalidation may never be terminated when an index that is planned to be invalidated is accessed, access is not made with the selected "index number", but the retry flag is set to ON to again issue an "access request" (steps ST05 and ST07). With the reissued "access request", for example, as shown in FIG. 7, an "index number" based on the "size after change" is necessarily selected, and regular access is made based on the "index 64" after change (a step ST08).

It is to be noted that, when an access request for the "index 192" is further input before the processing for invalidation is terminated, access to the "index 64" is finally made by the same procedure, and hence mismatch of data does not occur. Further, an access request for an "index 320" is input, this input is regarded as a "cache miss", and "hit/miss" is correctly judged even though an access request for the "index 64" is selected. That is because tag information (18 bits) of an access address of 64 Kbytes includes higher-order 3 bits in an index (9 bits) in 512 Kbytes as shown in FIG. 3D, and hence the tag information differs depending on access to the "index 192" and access to the "index 320" (the higher-order 3 bits of the index (=lower-order 3 bits in the tag information) is "011" or "101").

In this manner, since data stored at a position corresponding to an index that should be invalidated is not changed due to invalidation (rearranged) in any case, the processing for reducing the capacity of the cache memory is necessarily normally terminated.

As explained above, since the capacity of the cache memory is reduced while maintaining the number of ways, the present invention has resistance to a conflict miss as compared with an example where the capacity of the cache memory is reduced while reducing the number of ways. Furthermore, data whose index varies with a reduction in capacity alone is correctly invalidated, and access can be made during the processing for invalidation in response to an access request for an address whose index differs before and after a reduction. Therefore, penalties at the time of reducing the cache capacity can be reduced. For example, the capacity of the cache memory can be reduced dynamically, i.e., without inhibiting a regular access operation.

Moreover, a power consumption of the cache system can be of course suppressed when reducing the cache capacity.

Second Embodiment

FIG. 9 shows a structural example of a cache system according to a second embodiment of the present invention. It is to be noted that an example of further increasing a capacity of a cache memory will be described in this embodiment. Additionally, like reference numerals denote parts equal to those in the first embodiment, thereby omitting a detailed description thereof.

For example, it is assumed that a processor 11 issues an instruction of increasing a capacity of a cache memory to 512 Kbytes from 128 Kbytes while maintaining the number of ways. Then, this "increasing instruction" is supplied to an index converter 25, a cache increasing/reducing processing unit 26, and a tag comparator 22'.

Here, it is assumed that data, which is arranged in "indices 128, 256, and 384" after the size of the "index 0" is changed, is prestored in ways 0 to 2 of an "index 0". In this case, for example, as shown in FIG. 10, data in the way 0, data in the way 1 and data in the way 2 in the data stored in the "index 0" must be rearranged in the "index 128", the "index 256" and the "index 384", respectively. Since rearrangement is required in some cases, data in an index based on a "current size" must be invalidated, which differs from an example where the number of ways is simply increased.

Processing for invalidation is executed by the cache increasing/reducing processing unit 26 as in the first embodiment. When increasing the capacity, data that should be invalidated may be possibly stored in all of the current indices. Therefore, in this example, the respective ways 0 to 3 in each of "indices 0 to 127" are targets of the processing for invalidation.

The ways 0 to 3 to be invalidated are selected by a tag comparator 22'. That is, when the "increasing instruction" is input from the processor 11, the tag comparator 22' stores a "size after change" in a holder 22a and a "current size" in a holder 22b, respectively. Further, a comparative bit generator 22c generates 3-bit data (comparative bits) as a comparison target from the "current size" and the "size after change". On the other hand, tag information is read in accordance with each of the ways 0 to 3, and the read information is stored in a register 22d. Furthermore, each comparator 22e compares the trailing three bits in the tag information with the comparative bits. Each comparator 22e outputs "1" when they do not match. Moreover, a computing unit 22f takes a bit product of an output from the comparator 22e and a valid signal. When a result (an invalidation bit) of the computing unit 22f is "1", the way is an invalidation target.

Figures 11, 12:
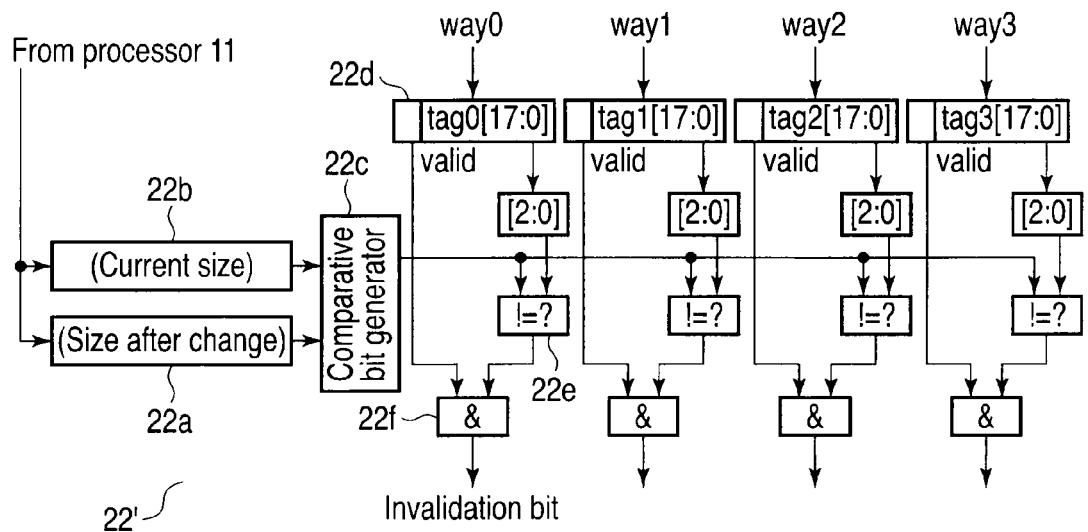
FIG. 11 is a block diagram showing a structural example of a tag comparator in the cache system according to the second embodiment.
FIG. 12 is a view showing a generation logic of a comparative bit generator constituting the tag comparator according to the second embodiment.

FIG. 12 shows a generation logic in the comparative bit generator 22c. It is to be noted that "?" in the comparative bits means that either "0" or "1" can be used. Additionally, the number of bits in the comparative bits is determined by "a necessary tag length at the time of a minimum size—a necessary tag length at the time of a maximum size", and it is determined as "3 bits" based on "18–15" in this example.

As shown in FIG. 12, the comparative bits are associated with each index before and after increasing the capacity. For example, when increasing the capacity of the cache from 128 Kbytes to 512 Kbytes, an end of the tag information becomes either "000" or "001". That is, since the indices are "0 to 127" when the capacity is 128 Kbytes, assignment of the indices is not changed before and after increasing the cache memory.

The tag comparator 22' selects the ways 0 to 3 to be invalidated in this manner, and the cache increasing/reducing processing unit 26 executes the processing for invalidation in accordance with a result of this selection. As a result, the capacity of the cache memory can be increased while maintaining the number of ways.

It is to be noted that, when a regular "access request" is generated during the processing of invalidation, the same operation as that in the first embodiment is carried out. For example, when accessing an invalidation target, an index before change based on the "current size" is temporarily accessed. Further, when this access is a "cache miss", an index based on the "size after change" is accessed anew.

According to this embodiment, not only can the capacity of the cache memory be reduced, but also the capacity of the cache memory can be increased while maintaining the number of ways by invalidating each way whose index varies with an increase in capacity. Furthermore, the capacity of the cache memory can be dynamically increased by enabling simultaneous execution of the regular access operation.

Third Embodiment

Figure 13:
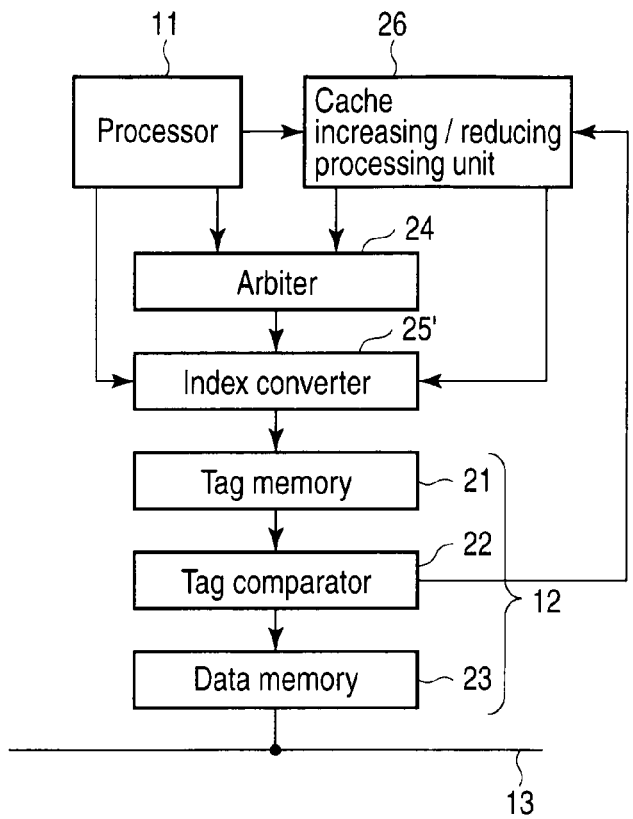
FIG. 13 is a block diagram showing a structural example of a cache system according to a third embodiment of the present invention.

FIG. 13 shows a structural example of a cache system according to a third embodiment of the present invention. It is to be noted that this embodiment is an example that is configured to avoid re-execution of access at the time of a cache miss. Further, like reference numerals denote parts equal to those in the first embodiment, thereby omitting a detailed explanation thereof.

Figure 14:
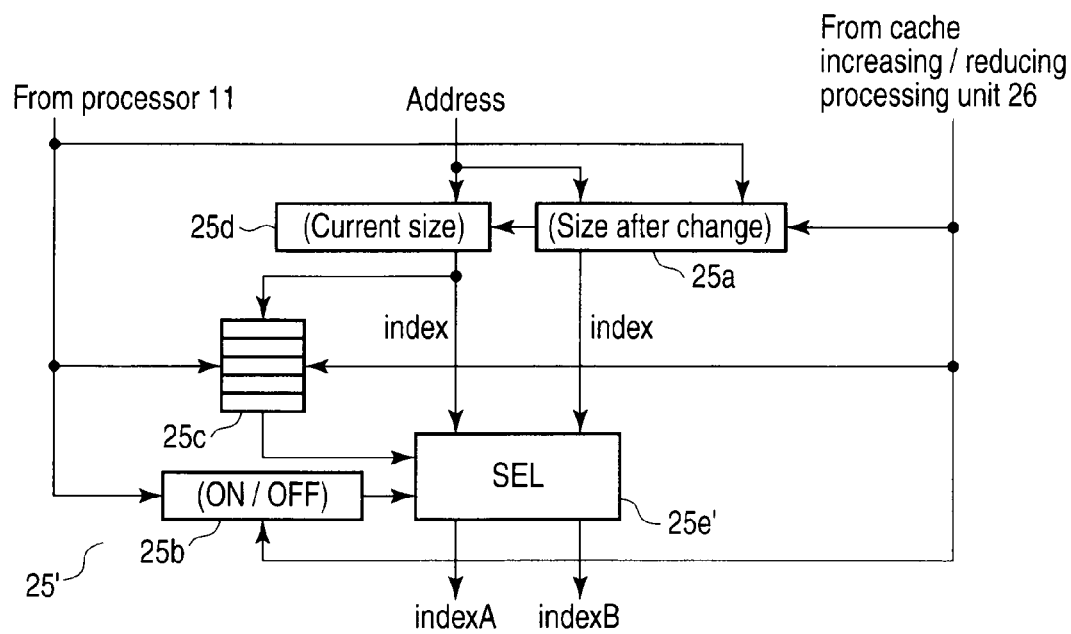
FIG. 14 is a block diagram showing a structural example of an index converter in the cache system according to the third embodiment.

In this embodiment, configurations of an index converter and a tag comparator are different from those in the first embodiment. In an index converter 25' according to this embodiment, a retry flag is not input to a selector 25e' as shown in, e.g., FIG. 14. Therefore, the selector 25e' selects an index A or an index B to be output in accordance with a state of an ON/OFF state machine 25b and information indicative of whether an index based on a "current size" obtained by making reference to an invalidation target table 25c is an invalidation target. The index A or the index B to be output is an index based on a "size after change" that is held in a holder 25a or an index based on the "current size" that is held in a holder 25d associated with an access address to be input.

A tag comparator 22 does not have a function of informing a processor 11 of termination of processing for invalidation.

Figures 15, 16:
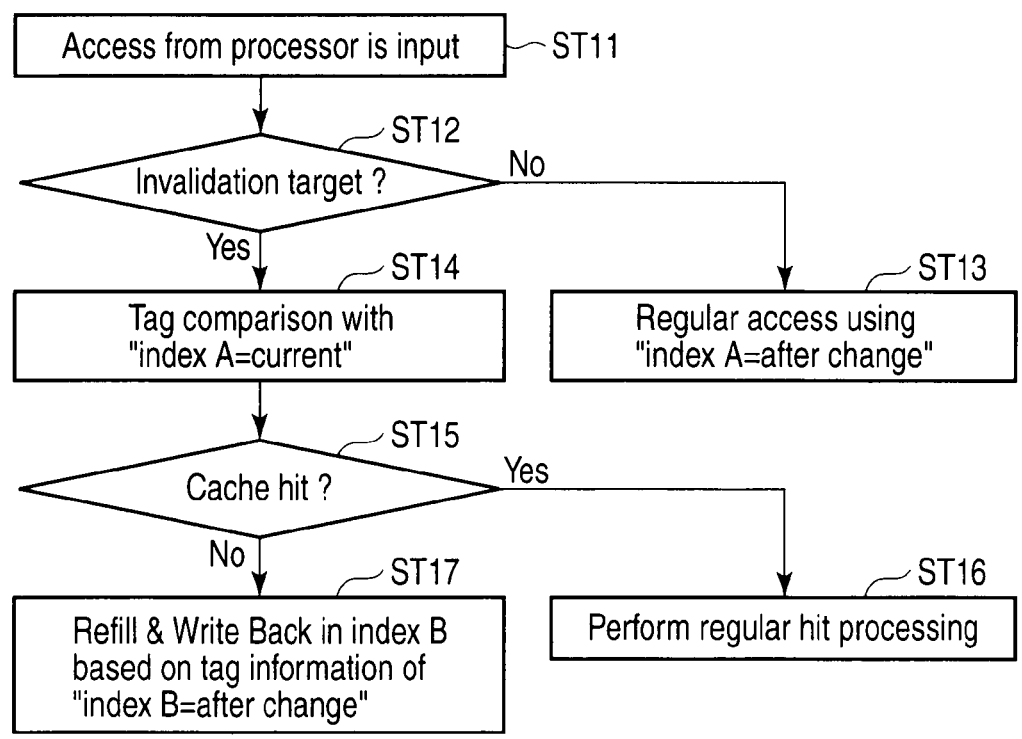
FIG. 15 is a view showing a selection logic for a selector constituting the index converter according to the third embodiment.
FIG. 16 is a flowchart for explaining a flow of processing when a regular cache access request is produced during execution of invalidation according to the third embodiment.

FIG. 15 shows a selection logic in the selector 25e'. It is to be noted that "Don't Care" in the index B means either "current" or "after change" can be adopted.

For example, when changing (increasing/reducing) a capacity of a cache memory, the index converter 25' outputs the index A or the index B selected by the selector 25e' to a tag memory 21. As a result, respective pieces of tag information associated with the index A and the index B are read and output to the tag comparator 22. At this time, when the index B corresponds to "Don't Care", the tag information associated with the index B does not have to be read out.

The tag comparator 22 compares the tag information associated with the index A read out from the tag memory 21 with tag information at an access address. Tag information used for regular tag comparison is, e.g., the tag information associated with the index A. The tag information associated with the index B is used only when a regular access request is made during the processing for invalidation.

A description will now be given as to an example where a conflict occurs due to regular cache access from the processor 11 during the processing for invalidation with reference to FIG. 16. An "access request" from the processor 11 is input to the index converter 25' (a step ST11).

When an accessed index is not an invalidation target, the tag information associated with the index A is used to execute regular access processing (steps ST12 and ST13).

On the other hand, when the accessed index is an invalidation target, the tag information associated with the index A is likewise utilized to judge a "cache hit/miss" (steps ST12, ST14, and ST15). In the case of a "cache hit", regular hit processing is executed (a step ST16). In the case of a "cache miss", the tag information associated with the index B is utilized to carry out processing for a cache miss (a step ST17). At this time, since an index based on the "size after change" is selected as the index B, the same access as that in the first embodiment can be consequently realized.

In this embodiment, when a regular access request is produced during the processing for invalidation when changing the capacity of the cache memory, the respective pieces of tag information associated with the two indices in which access target data may be possibly stored are simultaneously read out. As a result, re-execution of access at the time of a cache miss can be avoided, and an overhead with respect to a regular access request produced during the processing for invalidation can be reduced.

It is to be noted that the above description has been given as to the example where the number of ways in the cache memory is "4" (the 4-way cache) in each of the foregoing embodiments, but the present invention is not restricted thereto.

Additionally, the capacity of the cache memory can be readily increased/reduced irrespective of the number of ways.

Further, the cache system does not have to necessarily include the processor, and the processor may be omitted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cache memory system controlled by an arbiter, comprising:
    a memory unit having a cache memory whose capacity is changeable; and
    an invalidation processing unit that requests invalidation of data stored at a position where invalidation is performed when the capacity of the cache memory is changed in accordance with a change instruction,
    wherein the invalidation processing unit includes:
    an increasing/reducing processing unit that sets an index that is invalidated in accordance with a capacity before change and a capacity after change, and requests the arbiter to invalidate the set index; and
    an index converter that selects either an index based on the capacity before change or an index based on the capacity after change that is associated with an access address from the arbiter, and
    the invalidation processing unit enables changing the capacity of the cache memory while maintaining the number of ways in the cache memory.

2. The system according to claim 1, wherein, upon receiving an access request with respect to the cache memory during an operation of the invalidation processing unit,
    the arbiter controls the index converter to select the index based on the capacity after change and execute access processing by using the index based on the capacity after change if the index based on the capacity before change that is associated with the access address is not an invalidation target.

3. The system according to claim 1, wherein, upon receiving an access request with respect to the cache memory during an operation of the invalidation processing unit,
    the arbiter controls the index converter to select the index based on the capacity after change and execute access processing by using the index based on the capacity after change if the index based on the capacity before change that is associated with the access address is an invalidation target and an operation for invalidation is already terminated.

4. The system according to claim 1, wherein, upon receiving an access request with respect to the cache memory during an operation of the invalidation processing unit, the arbiter controls the index converter to select the index based on the capacity before change if the index based on the capacity before change that is associated with the access address is an invalidation target and an operation for invalidation is not terminated yet, and executes access processing by using the index based on the capacity before change if a result of tag comparison using the index based on the capacity before change is hit, and the arbiter controls the index converter to select the index based on the capacity after change and execute access processing using the index based on the capacity after change if the result of tag comparison is a miss.

5. The system according to claim 1, wherein the increasing/reducing processing unit includes:

a first holder that stores the capacity after change;
a second holder that stores the capacity before change;
a comparator that calculates a range of indices to be invalidated from the capacity before change and the capacity after change;
a third holder that stores indices as processing targets; and
a state machine that is turned on in accordance with the change instruction and requests invalidation for the indices as processing targets.

6. The system according to claim 1, wherein the index converter includes:

a first holder that stores the capacity after change;
a second holder that stores the capacity before change;
a table storing information indicative of whether the index based on the capacity before change is an invalidation target;
a selection circuit that makes reference to the information in the table to select either the index based on the capacity before change or the index based on the capacity after change depending on whether the index based on the capacity before change is an invalidation target; and
a state machine that is turned on in accordance with the change instruction and controls the selection circuit.

7. The system according to claim 1, wherein the memory unit further includes: a tag memory that stores tag information associated with the access address; and a tag comparator that compares the tag information read from the tag memory and tag information at the access address.

8. The system according to claim 1, wherein the memory unit further includes: a tag memory that stores tag information associated with the access address; and a tag comparator that compares the tag information read from the tag memory with tag information at the access address to set a way to be invalidated.

9. The system according to claim 1, wherein the index converter selects either the index based on the capacity before change or the index based on the capacity after change as a first or second selected index, and the arbiter uses the first selected index to execute access processing when the index based on the capacity before change that is associated with the access address is not an invalidation target upon receiving an access request with respect to the cache memory during an operation of the invalidation processing unit.

10. The system according to claim 1, wherein the index converter selects either the index based on the capacity before change or the index based on the capacity after change as a first or second selected index, and the arbiter uses the first selected index to execute access processing when the index based on the capacity before change that is associated with the access address is an invalidation target and a result of tag comparison using the first selected index is hit, or uses the second selected index to execute access processing when the result of tag comparison is a miss upon receiving an access request with respect to the cache memory during an operation of the invalidation processing unit.

11. A cache memory system controlled by an arbiter, comprising:

a memory unit having a cache memory whose capacity is changeable, the memory unit including a tag memory that stores tag information associated with an access address and a tag comparator that compares the tag information read from the tag memory with tag information at the access address; and
an invalidation processing unit that requests invalidation of data stored at a position where invalidation is effected when the capacity of the cache memory is changed in accordance with a reducing instruction,
wherein the invalidation processing unit includes:
an increasing/reducing processing unit that sets an index that is invalidated in accordance with a capacity before change and a capacity after change and requests the arbiter to invalidate the set index; and
an index converter that selects either an index based on the capacity before change or an index based on the capacity after change associated with the access address from the arbiter, and
the invalidation processing unit enables changing the capacity of the cache memory while maintaining the number of ways of the cache memory.

12. The system according to claim 11, wherein, upon receiving an access request with respect to the cache memory during an operation of the invalidation processing unit, the arbiter performs:

controlling the index converter to select the index based on the capacity after change and to execute access processing using the index based on the capacity after change when the index based on the capacity before change associated with the access address is not an invalidation target;
controlling the index converter to select the index based on the capacity after change and to execute access processing using the index based on the capacity after change when the index based on the capacity before change associated with the access address is an invalidation target and an operation for invalidation is already terminated;
controlling the index converter to select the index based on the capacity before change when the index based on the capacity before change associated with the access address is an invalidation target and an operation for invalidation is not terminated, and allowing execution of access processing using the index based on the capacity before change when a result of tag comparison using the index based on the capacity before change is hit; and
controlling the index converter to select the index based on the capacity after change and to execute access processing using the index based on the capacity after change if the result of tag comparison is a miss.

13. The system according to claim 11, wherein the increasing/reducing processing unit includes:

a first holder that stores the capacity after change;

a second holder that stores the capacity before change;
a calculator that calculates a range of indices to be invalidated from the capacity before change and the capacity after change;
a third holder that stores indices as processing targets; and
a state machine that is turned on in accordance with the reducing instruction and requests invalidation of the indices as the processing targets.

14. The system according to claim 11, wherein the index converter includes:
a first holder that stores the capacity after change;
a second holder that stores the capacity before change;
a table storing information indicative of whether the index based on the capacity before change is an invalidation target;
a selection circuit that selects either the index based on the capacity before change or the index based on the capacity after change by making reference to the information in the table to check whether the index based on the capacity before change is an invalidation target; and
a state machine that is turned on in accordance with the reducing instruction and controls the selection circuit.

15. The system according to claim 11, wherein the index converter selects either the index based on the capacity before change or the index based on the capacity after change as a first or second selected index, and
upon receiving an access request with respect to the cache memory during an operation of the invalidation processing unit, the arbiter performs:
allowing execution of access processing using the first selected index when the index based on the capacity before change associated with the access address is not an invalidation target;
allowing execution of access processing using the first selected index when the index based on the capacity before change associated with the access address is an invalidation target and a result of tag comparison using the first selected index is hit; and
allowing execution of access processing using the second selected index when the result of tag comparison is a miss.

16. A cache memory system controlled by an arbiter, comprising:
a memory unit having a cache memory whose capacity is changeable, the memory unit including a tag memory storing tag information associated with an access address and a tag comparator that compares the tag information read from the tag memory with tag information at the access address and sets ways to be invalidated; and
an invalidation processing unit that requests invalidation of data stored at a position where invalidation is performed when the capacity of the cache memory is changed in accordance with an increasing instruction,
wherein the invalidation processing unit includes:
an increasing/reducing processing unit that sets an index to be invalidated in accordance with a capacity before change and a capacity after change and requests the arbiter to invalidate the set index; and
an index converter that selects either an index based on the capacity before change and an index based on the capacity after change associated with the access address from the arbiter, and
the invalidation processing unit enables changing the capacity of the cache memory while maintaining the number of ways of the cache memory.

17. The system according to claim 16, wherein, upon receiving an access request with respect to the cache memory during an operation of the invalidation processing unit, the arbiter performs:
controlling the index converter to select the index based on the capacity after change and to execute access processing using the index based on the capacity after change when the index based on the capacity before change associated with the access address is not an invalidation target;
controlling the index converter to select the index based on the capacity after change and to execute access processing using the index based on the capacity after change when the index based on the capacity before change associated with the access address is an invalidation target and an operation for invalidation is already terminated;
controlling the index converter to select the index based on the capacity before change when the index based on the capacity before change associated with the access address is an invalidation target and the operation for invalidation is not terminated, and allowing execution of access processing using the index based on the capacity before change when a result of tag comparison using the index based on the capacity before change is hit; and
controlling the index converter to select the index based on the capacity after change and allowing execution of access processing using the index based on the capacity after change when the result of tag comparison is a miss.

18. The system according to claim 16, wherein the increasing/reducing processing unit includes:
a first holder that stores the capacity after change;
a second holder that stores the capacity before change;
a calculator that calculates a range of indices to be invalidated from the capacity before change and the capacity after change;
a third holder that stores indices as processing targets; and
a state machine that is turned on in accordance with the increasing instruction and requests invalidation of the indices as the processing targets.

19. The system according to claim 16, wherein the index converter includes:
a first holder that stores the capacity after change;
a second holder that stores the capacity before change;
a table that stores information indicative of whether the index based on the capacity before change is an invalidation target;
a selection circuit that selects either the index based on the capacity before change or the index based on the capacity after change by making reference to the information in the table to check whether the index based on the capacity before change is an invalidation target; and
a state machine that is turned on in accordance with the increasing instruction and controls the selection circuit.

* * * * *